March 15, 1949.                R. FENNEMA                    2,464,744
                            PRESSURE SEAL JOINT
                           Filed March 21, 1946
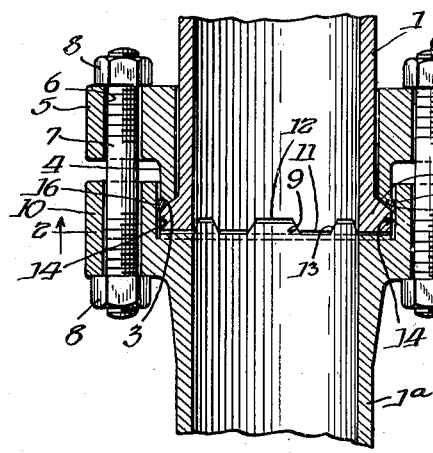
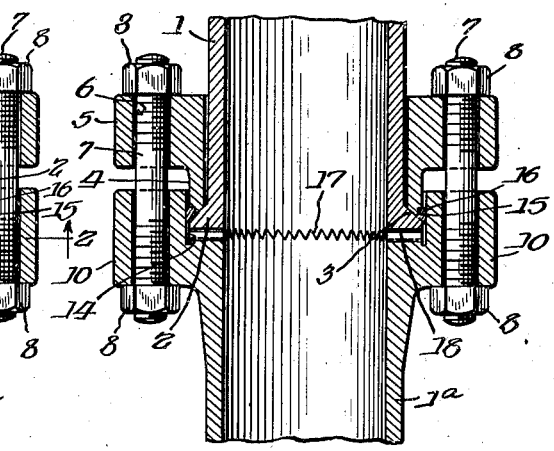
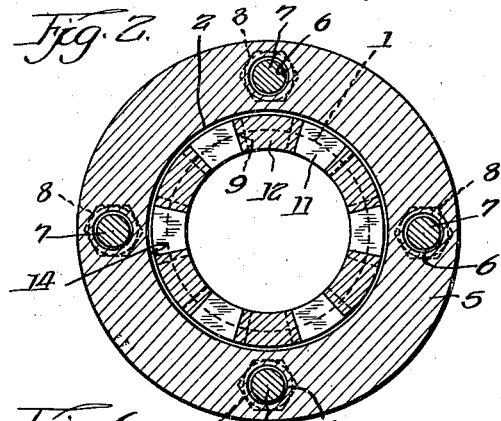
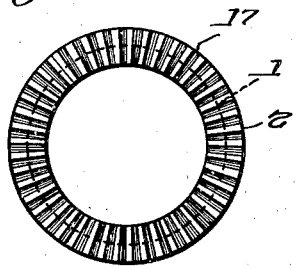
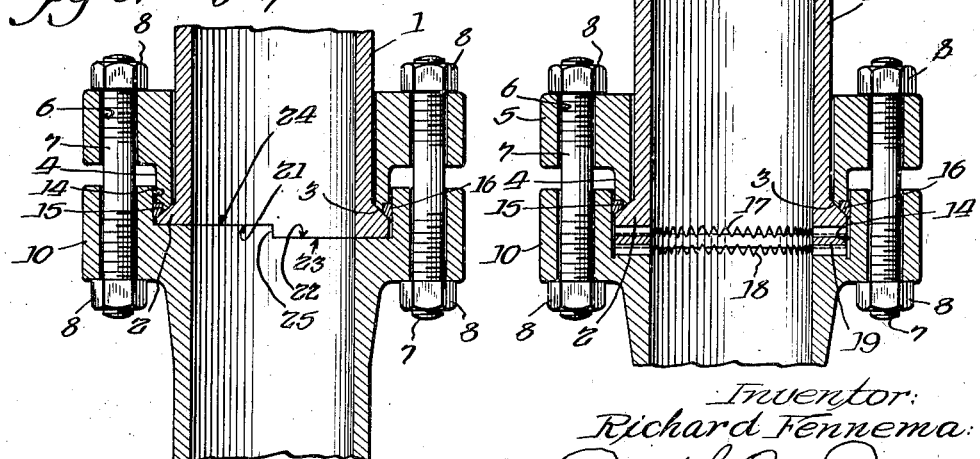
Inventor:
Richard Fennema
By: Joseph O. Lange, Atty.

Patented Mar. 15, 1949

2,464,744

UNITED STATES PATENT OFFICE 2,464,744

PRESSURE SEAL JOINT

Richard Fennema, Chicago, Ill., assignor to Crane Co., Chicago, Ill., a corporation of Illinois Application March 21, 1946, Serial No. 655,911

3 Claims. (Cl. 285—135)

This invention relates to pipe joints for pressure vessels and the like. More particularly it pertains to an improved pressure sealed joint suitable for use with pipe or with end flange connections or with direct integral connection to flanges, valves and fittings.

Also as will more readily become apparent this invention is capable of application to other forms of internal pressure vessel connections as for example, with the bonnet of a valve or with other types of similar devices in which the maintenance of fluid pressure tightness is important.

In order to obtain a better appreciation of the background of this invention, it should be understood that in connection with the type of joint, as for example shown in pending patent application, Serial No. 621,434 filed October 10, 1945 and entitled Pipe joints for pressure vessels, it has been a serious problem to prevent the flanges of either the pipe or the separate companion or integral flanges, assembled with the pipe, from turning or swiveling with relation to the pipe itself during the course of service when expansion, contraction and twisting strains are encountered. Such swiveling of the pipe is necessarily objectionable because in so doing it frequently causes the galling, abrasion or tearing of the sealing gasket with the ultimate result that the surfaces of the gasket become scuffed or torn and objectionable fluid leakage ensues.

Therefore this background is mentioned in connection with the novel provision hereinafter described which provides a positive means for economically and in a relatively simple manner preventing the objectionable rotation, swiveling or twisting of the pipe relative to the flanges referred to.

A further important object is to provide a type of rotation prevention means simulating the positive gripping action of a castle type clutch mechanism, thereby firmly holding the flange against the face of the tubing and preventing the rotation of the latter member.

Another object is to provide a means for preventing swiveling whereby the packing may be compressed under relatively high loads while at the same time during the course of such compression there is positively inhibited any tendency for the flange or the pipe or both to rotate relative to each other.

Other objects and advantages will become more readily apparent in the course of proceeding with the following specification read in light of the accompanying drawings, in which Fig. 1 is a fragmentary sectional view of a pipe-flange joint embodying a preferred form of my invention.

Fig. 2 is a sectional view taken on the line 2—2 of Fig. 1.

Fig. 3 is a modified form of the invention.

Fig. 4 is an end view of the pipe in the modified form of the invention shown in Fig. 3.

Fig. 5 is a sectional view of a further modified form of the invention.

Fig. 6 is a sectional view of a further modified form.

Similar reference characters refer to similar parts throughout the several views.

Referring now to Fig. 1, the invention is shown as applied to a pair of pipes designated 1 and 1a. The pipe 1 has the annular flange 2, the latter being provided on the back with a circumferentially extending inclined surface 3 against which the projecting annular portion 4 of the flange 5 bears as indicated, the flange 5 being provided with the bolt holes 6 and the conventional bolts 7 with the nuts 8. Obviously the flange 5 may be made as a separate unit rather than integral therewith as shown.

The bolts or studs 7 extend through a similar flange generally designated 10. The latter flange as indicated may also be integral with the pipe 1a or as shown in connection with the flange 5 it may be made separately as a loose flange to enclose a flanged end of tubing projecting therethrough, as shown in the upper portion of this figure or in other words duplicating the pipe and flange assembly. The connecting end of the enlarged portion 2 of the pipe 1 is provided annularly with the recesses and projections designated 9 and 11 to receive the interlocking alternately positioned projections 12 of the flange 10. The recesses therebetween match the respective recesses and projections extending completely around the flanged pipe and flange as shown more clearly in the section in Fig. 2. The inner end portion of the projection 4 as indicated is annularly recessed at 15 to receive a relatively soft gasket 16 snugly retained within the recess 14 of the flange 10. Thus the projecting and recessed portions 9, 11, 12 and 13 are maintained in interlocked relation and positively prevent the rotation or swiveling of the flanged tubing 1 relative to the flange 10. Therefore the closely retained gasket 16 can only have a direct axial compression load applied to it and any torsional or twisting forces will be positively inhibited by the locking means just described.

Obviously the detailed manner in which the flanged pipes 1 and 1a shown in Fig. 1 are attached may vary considerably, for example, the illustrated integral flange construction may optionally be replaced by a separate companion flange by merely duplicating the upper portion of the figure in the lower half and having a loose flange substituted for the integral flange for engagement with interposed section 11 of the flanged tubing 10.

Under certain predetermined conditions of operation in which the flange and tubing rotational tendency is not so powerful as to require the more rugged construction shown in Fig. 1, the modified construction in Fig. 3 may be used. In the latter case the inner ends of the flange and pipe may be made simply roughened or else provided with radially extending serrations 17, the latter being preferably positioned transversely so as to prevent the flange from rotating under conditions of torsional stress when the pipe line may be subjected to twisting strains due either to structural difficulties or else to excessive pressure conditions within the pipe line, or to temperature changes or a combination of these conditions. The latter construction is generally more economical than that described in connection with Figs. 1 and 2 and may be used either with integral flanges or with flanged tubing as illustrated in Fig. 1. In this construction the inner end portion of the recess 14 will preferably be similarly serrated as at 18 to engage the pipe serrations 17 to form a locking connection.

Under other conditions of operation, it may be desirable to interpose a gasket between the roughened surfaces of the abutting flangepipe or tubing or where integral flanges are employed. In the latter case a soft iron gasket 19 may be employed as shown in Fig. 5 as a further modified form. In this construction of course, it is apparent that the gasket itself may not necessarily be serrated; that is both faces of the gasket may be left smooth but the oppositely disposed radially serrated surfaces of the abutting flanges or tubing at 17 and 18 may be serrated in a manner similar to that shown in Fig. 3 and then simply permit the gasket under the bolt compression load to be gripped by the roughened or serrated surfaces sufficiently to provide a biting grip therebetween. The gasket sealing means is similar to that employed in connection with Figs. 1 to 3 inclusive.

In a still further modified form as shown in Fig. 6 the pipe 1 may be locked against rotation relative to the flange 10 in a simple manner by merely cutting away a substantial end surface arcuate portion as at 21 and 22 respectively on pipe 1 and flange 10, having thereby formed oppositely disposed arcuate projections at 23 and 24, bearing at the radially or diametrically extending surfaces 25 to hold the pipe and flange in non-rotatable position relative to each other.

Obviously too, the manner of attachment of either the integral or loose flanges may differ as for example, by means of large screw threads or by clamps rather than by means of bolts. Also a soft non-metallic or composition gasket may be used instead of the soft iron gasket as above described. This choice will largely depend upon the character of the service for which the final installation is intended.

It should of course be apparent from the description hereinabove given that the particular construction may vary substantially from that described and it is desired therefore not to be limited to the details illustrated and described. Many variations and changes may be made without departure from the spirit of the invention and the scope of the appended claims.

I claim:

1. In a pressure sealed joint, the combination comprising at least one substantially tubular member provided with an enlarged end portion and having at its opposed face another tubular member disposed in abutting relation, recessed flanges with annularly arranged means for holding the said tubular members in abutting relation, one of the said flange members receiving one of the said tubular members, the latter tubular member having an annular inclined surface on the rear side of the enlarged end portion, interlocking surface means on the end abutting portion of the said tubular member to engage similar surface means on the flange to prevent rotation of the said tubular member relative to the said flange, packing disposed on the said annular inclined surface and between the recess of one of the said flanges and the enlarged portion of the tubular member for effecting pressure sealing contact respectively with the inclined surface of the said tubular member, the recess of the adjoining flange and an end projecting surface portion of one of the said flanges.

2. In a pressure sealed joint, the combination comprising at least one substantially tubular member provided with an enlarged annular end portion and having at its opposed face another substantially tubular member disposed in abutting relation, to receive the first named tubular member, annularly arranged means for holding the said substantially tubular members in abutting relation including a flange member enclosing an annular end portion of the said tubular member having the enlarged annular end portion, the latter tubular member having an annular inclined surface on the rear side of the enlarged annular end portion, annularly disposed interlocking means on the end face portion of the said enlarged annular end of the tubular member comprising spaced apart projecting portions snugly engaging oppositely disposed recessed end surfaces on the said tubular member to inhibit axial rotation of the said tubular members relative to each other, fluid sealing means annularly disposed between an inner peripheral portion of the said flange member and the outer peripheral limits of the enlarged portion of the tubular member for effecting a pressure sealing contact between the said relatively non-rotatably disposed tubular members substantially concurrent with drawing said annularly arranged means together.

3. In a pressure sealed joint, the combination comprising a substantially tubular member provided with an enlarged end portion and having at its opposed face a substantially tubular member disposed in abutting relation thereto, flanges with annularly arranged means for holding the tubular members in said abutting relation, one of the said flanges being recessed for receiving the enlarged end of one of the said tubular members, the latter tubular member having an annular inclined surface on a rearward face of the enlarged portion, annular means on the end face portion of the said enlarged tubular member cooperating with similar means recessed within the said flange member to inhibit rotation of the said tubular member relative to the said flange, an annular member interposed between the said annular means for inhibiting rotation of the tubular members to maintain the said annular means normally in spaced apart relation, packing disposed between the periphery of the inner annular recessed portion of the said flange and an outer peripheral inclined surface portion on the enlarged end of the tubular member for effecting a pressure seal respectively on a portion of the annular surface of the said tubular member and with the said periphery of the inner annular recessed portion of the flange.

RICHARD FENNEMA.

REFERENCES CITED

The following references are of record in the file of this patent:

UNITED STATES PATENTS

| Number | Name | Date |
|---|---|---|
| 579,643 | Gleason | Mar. 30, 1897 |
| 1,177,638 | Larson et al. | Apr. 4, 1916 |
| 1,866,619 | Carson | July 12, 1932 |
| 1,423,754 | Clark | July 25, 1922 |
| 1,474,435 | McWane | Nov. 20, 1923 |
| 2,303,031 | Dusevoir | Nov. 24, 1942 |
| 2,314,867 | Boynton | Mar. 30, 1943 |